US 6,718,868 B2

(12) United States Patent
Ismail et al.

(10) Patent No.: US 6,718,868 B2
(45) Date of Patent: Apr. 13, 2004

(54) FRESH COMMODITY PEELING SYSTEM AND METHOD

(75) Inventors: Mohamed A. Ismail, Lake Alfred, FL (US); Shi-Chiang Pao, Winter Haven, FL (US); Mark Thomas, Lake Alfred, FL (US); Rudi C. Groppe, Gilroy, CA (US); Eric Davidson, Salinas, CA (US)

(73) Assignee: Florida Department of Citrus, Lakeland, FL (US)

( * ) Notice: Subject to any disclaimer, the term of this patent is extended or adjusted under 35 U.S.C. 154(b) by 0 days.

(21) Appl. No.: 10/123,901

(22) Filed: Apr. 16, 2002

(65) Prior Publication Data

US 2002/0185014 A1 Dec. 12, 2002

Related U.S. Application Data

(63) Continuation-in-part of application No. 09/548,962, filed on Apr. 13, 2000, now Pat. No. 6,371,014.
(60) Provisional application No. 60/129,146, filed on Apr. 14, 1999.

(51) Int. Cl.⁷ ............................. A23N 7/00; A47J 17/00
(52) U.S. Cl. .............................. 99/584; 99/587; 83/879
(58) Field of Search ........................ 99/540, 584–599; 83/879, 883–887

(56) References Cited

U.S. PATENT DOCUMENTS

| | | |
|---|---|---|
| 2,277,003 A | 3/1942 | Polk, Jr. |
| 2,396,444 A | 3/1946 | Singer |
| 2,888,969 A | 6/1959 | Hardesty et al. |
| 3,073,365 A | 1/1963 | Polk, Jr. et al. |
| 3,451,451 A | 6/1969 | Polk, Jr. |
| 3,700,017 A | 10/1972 | Vincent et al. |
| 4,355,572 A | 10/1982 | Silvestrini |
| 4,446,782 A | 5/1984 | Black |
| 4,729,299 A | 3/1988 | Hatch |
| 4,738,195 A | 4/1988 | Berube et al. |
| 4,873,106 A | 10/1989 | Kolodesh et al. |
| 4,889,045 A | 12/1989 | Backus |
| 4,998,466 A | 3/1991 | Nagaoka |
| 5,046,411 A | 9/1991 | le Grand et al. |
| 5,105,734 A | 4/1992 | Foxcroft et al. |
| 5,133,250 A | 7/1992 | Del Ser Gonzalez |
| 5,178,057 A | 1/1993 | Nahir et al. |
| 5,231,921 A | 8/1993 | Kirk |
| 5,396,837 A | 3/1995 | Backus |
| 5,759,611 A | 6/1998 | Langfitt, Jr. |
| 5,817,360 A | 10/1998 | Pao et al. |
| 6,371,014 B1 * | 4/2002 | Ismail et al. .................. 99/584 |

FOREIGN PATENT DOCUMENTS

| | | |
|---|---|---|
| FR | 2 672 474 | 11/1991 |
| JP | 45-31354 | 12/1965 |
| SU | 1357005 | 6/1985 |

OTHER PUBLICATIONS

Brochure entitled "Peeling Perfection," by Bacus Sormac B.V., no date but is admitted prior art.
Brochure entitled "Onion Peeler USM–1," by Backus Sormac B.V., 1996.
Brochure entitled "Word's Most Cost Effective Melon Peeler," by Murotech Corporation.
Brochure entitled "Citrus Peeler," by Murotech Corporation, 1987.

* cited by examiner

*Primary Examiner*—Drew E Becker
(74) *Attorney, Agent, or Firm*—Allen, Dyer, Doppelt, Milbrath & Gilchrist, P.A.

(57) ABSTRACT

A peeling device supports a fresh commodity in a first position in a nonspecific orientation. The commodity is impelled using a thruster toward a scoring structure for scoring the peel to a predetermined depth into two sectors. Peel grippers hold the peel between the scores and release the peeled commodity, such that the peel is retained on the gripping means. The thruster is positioned and adapted to force the commodity along a path to engage the cutting and peel-gripping elements, the thruster bottom surface changeable from a first, generally concave orientation for conforming to a shape of the commodity to a second, generally convex orientation for releasing the commodity from the peel.

10 Claims, 16 Drawing Sheets

FRESH COMMODITY PEELING SYSTEM AND METHOD

CROSS-REFERENCE TO RELATED APPLICATION

This application is a continuation-in-part of application Ser. No. 09/548,962, filed Apr. 13, 2000, now issued U.S. Pat. No. 6,371,014, "Fresh Commodity Peeling System and Method," which itself claims priority from provisional application No. 60/129,146, filed Apr. 14, 1999.

BACKGROUND OF THE INVENTION

1. Field of the Invention

The present invention relates to systems and methods for peeling fresh commodities and, more particularly, to such systems and methods for peeling generally ellipsoidal fruits and vegetables, such as fresh citrus fruit and onions.

2. Description of Related Art

Consumer demand for fresh cut produce has stimulated a renewed interest in developing and improving automated fresh commodity peeling methods. Traditional techniques for citrus peeling, for example, typically have consisted of hand or mechanical peeling facilitated by steam treatment to loosen the peel and/or chemical digestion to remove peel remnants. However, since these techniques often damage the flesh, an enzymatic peeling process was developed to produce fruit more suitable for the fresh market (Bruemmer, U.S. Pat. No. 4,284,651; Kirk, U.S. Pat. No. 5,196,222; Elliott et al, U.S. Pat. No 5,200,217). This process of enzymatic peeling comprises scoring or perforating the fruit peel, submerging the fruit into solution containing an enzyme (pectinase and/or pectinase and cellulase), and forcing the solution into the peel with the use of a vacuum. Another method comprises using pressure pulses (Adams and Kirk, U.S. Pat. No. 5,000,967). The enzyme solution partially digests the pectin-rich albedo (the inner part of the peel) and the regions of the intersegment membranes and thus facilitates the separation of fruit from peel and sectioning of the fruit while leaving the flesh nearly intact.

Vacuum and pressure-pulse infusion are usually effective in imbuing the peel with solution. When the fruit surface is not sterilized and thoroughly cleaned, however, microbiological contaminants and chemical residues on the surface may desorb into solution while the fruit is submerged and contact the flesh during infusion. The likelihood of contamination increases if the infusion solution is reused in order to conserve water or enzyme.

Enzymatically peeled citrus fruit may exhibit juice leakage and softening during storage in spite of apparent preservation of the integrity of segment membranes and juice vesicles. The quality of these fruit may be improved by various means known in the art.

A composition for washing and peeling citrus fruit has been disclosed by Askienazy et al. (U.S. Pat. No. 3,970,762). A device for peeling mandarin oranges has been disclosed in a Japanese patent issued to Yamato Seikan Co., Ltd. (Jap. Pat. No. 45-31354). Fruit peelers have also been disclosed by Polk (U.S. Pat. No. 2,277,003), Singer (U.S. Pat. No. 2,396,444), Vincent et al. (U.S. Pat. No. 3,700,017), Black (U.S. Pat. No. 4,446,782), Hatch (U.S. Pat. No. 4,729,299), Berube et al. (U.S. Pat. No. 4,738,195), Nagaoka (U.S. Pat. No. 4,998,466), le Grand et al. (U.S. Pat. No. 5,046,411), Foxcroft et al. (U.S. Pat. No. 5,105,734), Del Ser Gonzalez (U.S. Pat. No. 5,133,250), and Kirk (U.S. Pat. No. 5,231,921).

SUMMARY OF THE INVENTION

It is therefore an object of the present invention to provide a device, system, and method for peeling a fresh commodity.

It is a further object to provide such an invention useful for peeling citrus fruit.

It is also an object to provide such an invention that does not require a specific orientation of the fruit prior to peeling.

It is an additional object to provide a device useful for peeling onions.

It is yet a further object to provide a commodity peeling system and method that are substantially fully automated.

Citrus fruit in general comprises an inner body comprising a plurality of radial adjacent fruit segments surrounded by a peel that consists of a flavedo (outer, colored peel portion) and an albedo (inner, white peel portion). Different varieties of citrus are more or less difficult to peel, and have more or less albedo, which should be removed for effective peeling. The device, system, and method presented herein address both of these problems by providing a system and method for preparing citrus fruit for peeling and a device and method for removing the peel. Although not intended to be limiting, the device, system, and method may be used on a variety of citrus fruit. In addition, the device and method may be used on other fresh commodities having a peel, particularly onions.

In U.S. Pat. Nos. 5,560,951 and 5,817,360, which are commonly owned with the present application, and the disclosures of which are incorporated herein by reference, a method has been disclosed that comprises the steps of forming plural openings in the peel and infusing an aqueous solution between the cuticle and the fruit segments through the openings. A pressure differential is applied to the infusing water relative to the pressure exterior of the fruit sufficient to radially expand the peel and to separate the peel from the body of the fruit. In one embodiment, the aqueous solution comprises water that is essentially free of any enzymes or other active ingredients in sufficient amounts to chemically attack or react with the cuticle, albedo, or fruit segments. However, certain varieties of citrus fruit grown in particular geographical regions and climates may require the use of enzyme pretreatment to successfully loosen the peel prior to introducing the fruit into the device of the present invention.

It is also desired to provide a device to peel the pretreated fruit and a system that will enable substantially complete automation of the process. The system of the present invention, which broadly is for peeling a fresh commodity, comprises means for piercing a peel of the fresh commodity in a plurality of spaced-apart locations. Means for vacuum infusing the pierced commodity with an aqueous solution to loosen the peel are also provided, as well as means for making a plurality of scores in the infused commodity to a predetermined depth. Preferably, the scores are made along generally circumferential lines having substantially common endpoints.

Means for gripping the peel between the scores are next employed. The scoring and gripping means are engaged by a means for forcing the commodity into sequential communication therewith. The peel-gripping means is adapted to hold the peel to permit a release of a peeled commodity.

The peeling device in a particular embodiment comprises means for supporting the fresh commodity in a first position. The support means is movable between a position for retaining the commodity in the first position and a releasing position for permitting the commodity to leave the support means. The support means is biased to the retaining position.

Means are provided for impelling the commodity in a direction adapted to move the support means from the retaining position to the releasing position. Means are also provided for receiving the released commodity into a second position and for making a plurality of scores in the commodity to a predetermined depth with the commodity moving from the first to the second position. Preferably the scores are made along generally circumferential lines having substantially common endpoints.

Means are included for releasing the scored commodity from the second position and for receiving the scored commodity into a third position.

Means are provided for gripping the peel between the scores with the commodity moving from the second to the third position and for releasing the peeled commodity from the third position, such that the peel retained on the gripping means.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
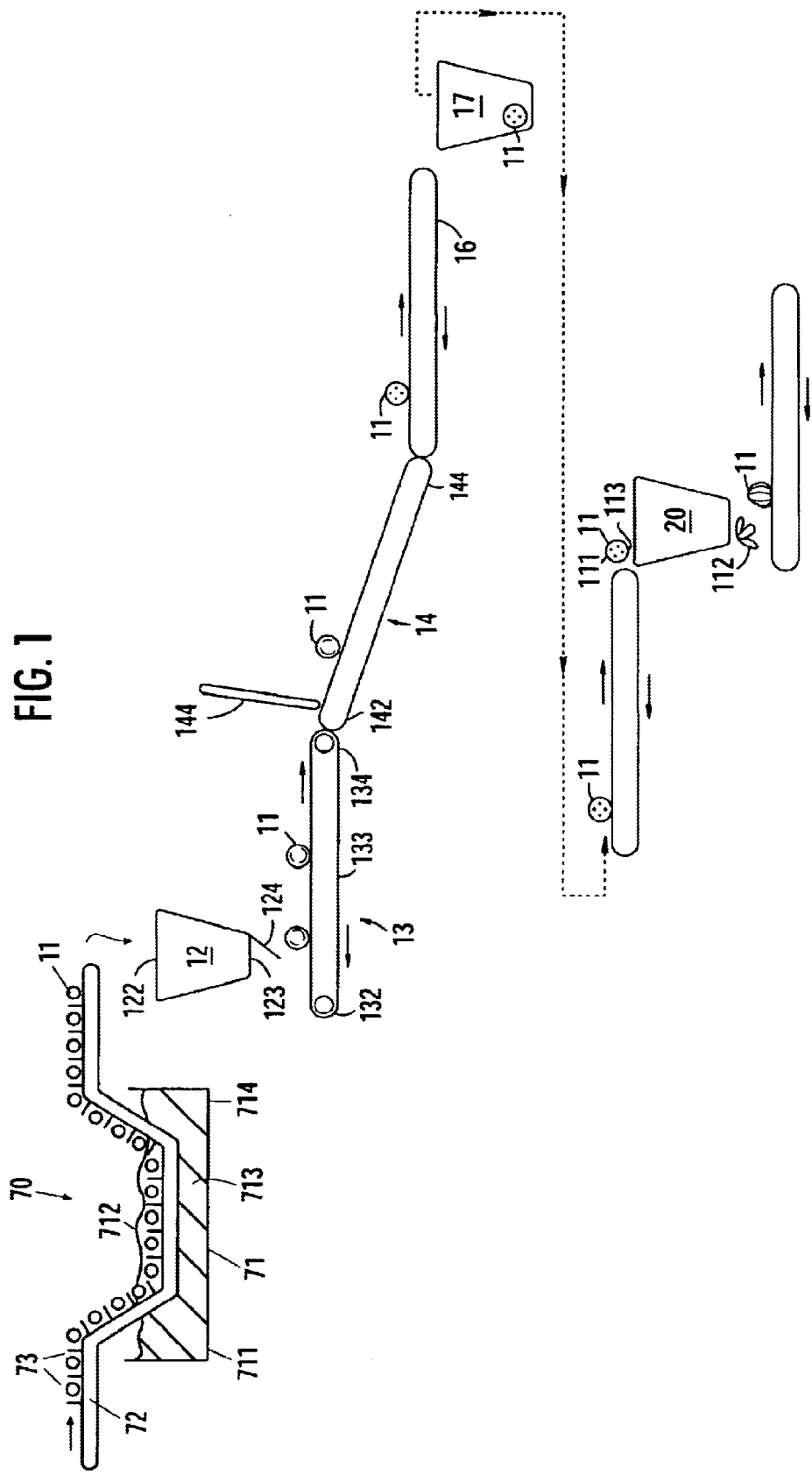
FIG. 1 is a schematic diagram of the peeling system of the present invention.

A description of the preferred embodiments of the present invention will now be presented with reference to FIGS. 1–23.

A first embodiment of the system 10 (FIG. 1) is for peeling a fresh commodity, which may comprise, but is not intended to be limited to, a citrus fruit 11. In a particular embodiment, the fruit 11 is delivered to a disinfection device 70, which comprises an aqueous bath 71 through which a conveyor 72 travels. The conveyor 72 comprises compartments 73 for holding the fruit 11 therein, and proceeds from a first end 711 of the bath 71, dips downward beneath a surface 712 of the fluid 713, and emerges at a second end 714 of the bath. In a preferred embodiment, the speed of the conveyor 72 and the temperature of the fluid 713 in the bath 71 are regulated so that fruit 11 will experience a temperature in a range of approximately 168–176° F. for 1–2 minutes, in order to disinfect the fruit from microbial contamination and also to facilitate the subsequent peel perforation process.

The conveyor 72 then delivers the fruit 11 to a hopper 12, for holding the fruit 11 prior to processing. The hopper 12 may comprise one such as are known in the art, and include a top opening 122 into which fruit 11 to be processed are directed and a smaller bottom opening 123 that is selectively closable by means of a gate 124. The bottom opening 123 is positioned above an inlet end 132 of a cleaning and brushing bed 13, such as is known in the art. An element of the bed 13 is a conveyor belt 133, which transports the fruit 11 to an outlet end 134.

Figure 2:
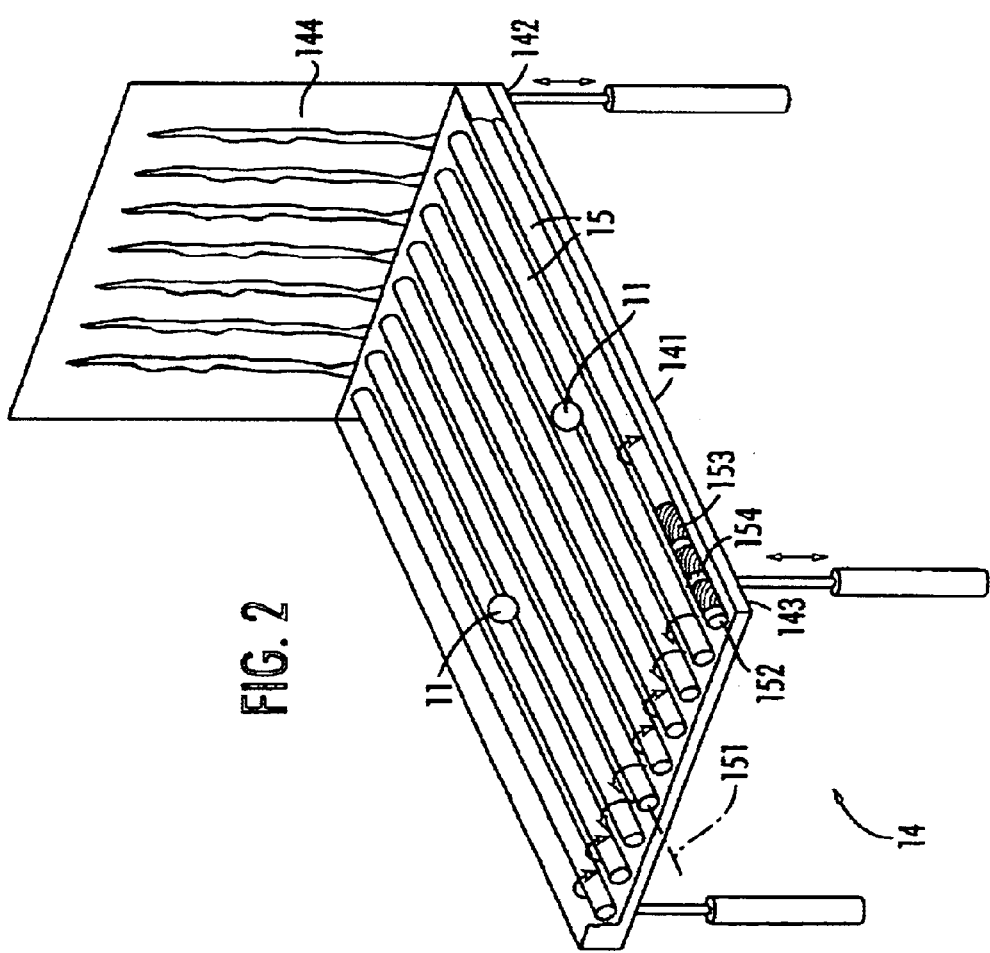
FIG. 2 is a side perspective view of the roller bed.
Figure 4:
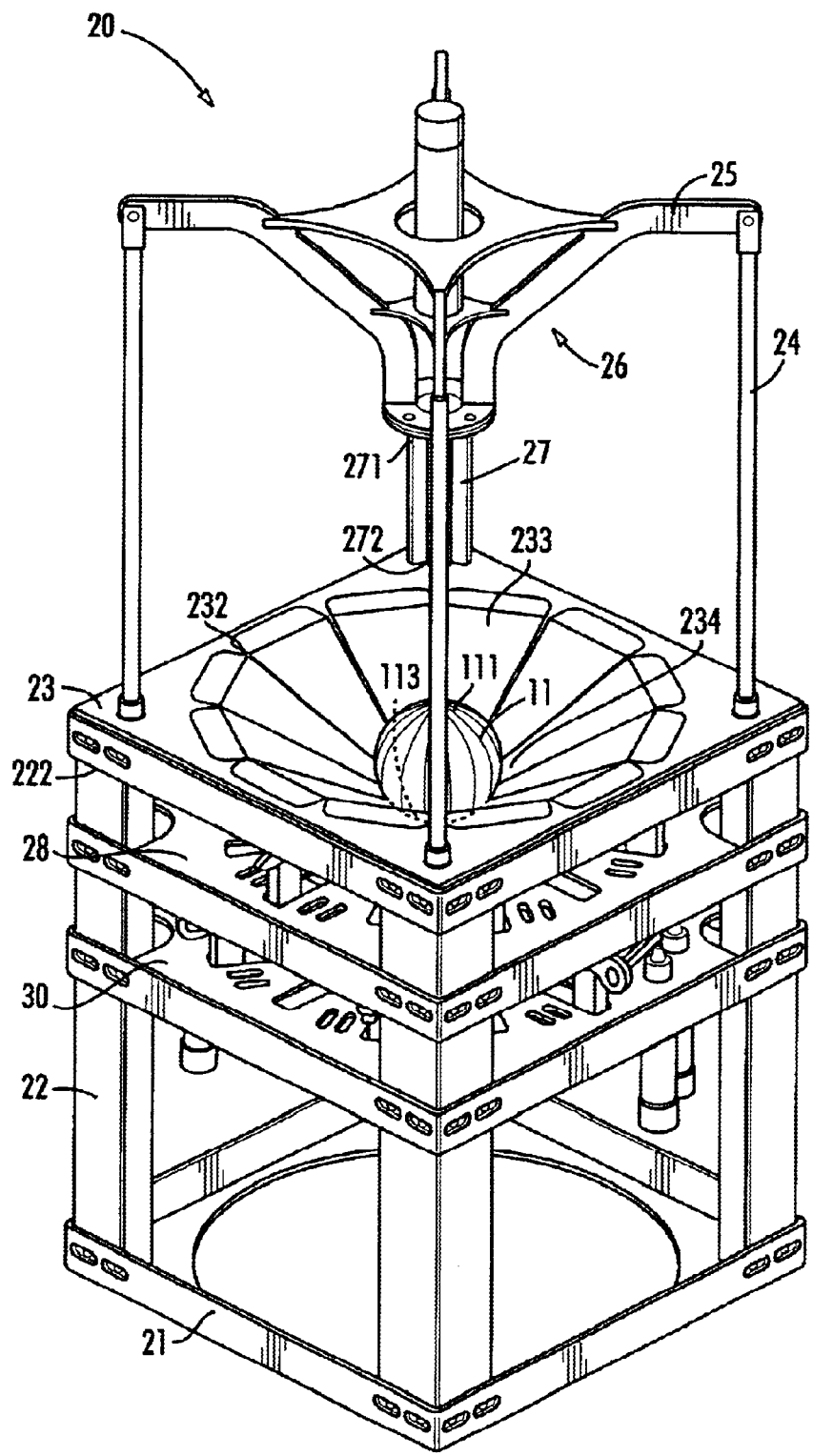
FIG. 4 is a perspective view of the peeling device.

The outlet end 134 of the bed 13 deposits fruit 11 to a means for piercing the fruit's peel 112 in a plurality of spaced-apart locations (FIG. 2). In a preferred embodiment the piercing means comprises a roller bed 14 that includes a support structure 141 that slants downward from an inlet end 142 to an outlet end 143. Most preferably, the incline of the support structure 141 is adjustable in order to regulate the speed of travel of the fruit 11. A baffle 144 may be positioned between the cleaning bed's outlet end 134 and the roller bed's inlet end 142 in order to slow the fruit's 11 progress prior to entering the roller bed 14 and also the direct the fruit 11 to one of a plurality of desired locations.

At least one, and preferably several, pairs of generally adjacent cylindrical rollers 15 are supported for rotation on the support structure 141. The rollers 15 are aligned in generally parallel orientation, with their longitudinal axes 151 extending from the inlet end 142 to the outlet end 143. Each pair of rollers 15 forms a lane between them along which the fruit 11 may roll down the roller bed's incline and to which the fruit 11 is directed by the baffle 144.

Each of the rollers 15 comprises a base cylinder 152 and a plurality of spaced-apart annular sleeves 153 that are positioned around the base cylinder 162. Preferably the sleeves 153 comprise a polymeric material that is adapted to avoid damaging the fruit 11 during contact therewith.

Figure 3:
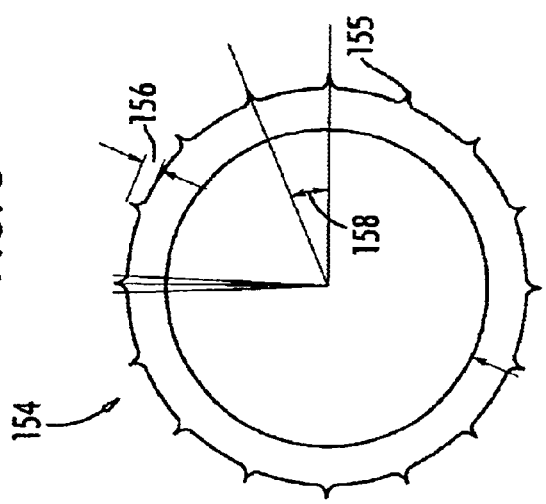
FIG. 3 is an axial cross-sectional view of a piercing element from the roller bed.

A ring 154 is positioned between adjacent sleeves 153, from which a plurality of needle-like projections extend outwardly (FIG. 3). The projections in a preferred embodiment comprise barbs 155 that are configured sufficiently large to permit a passage of aqueous solution therethrough and sufficiently small to resist a tearing of the peel 112 in subsequent scoring and gripping elements. The barbs 155 are straight, laser-machined barbs, and extend substantially normal to a surface of a roller 15.

After substantial experimentation, the following dimensions were deemed preferable for piercing oranges: a barb height 156 of 0.125 in., an angular separation between adjacent barbs 158 of 22.5°.

The rollers 15 are rotatable at variable speeds about their longitudinal axes 151. It has been found to be advantageous to rotate the rollers 15 in a common direction in order to avoid tearing the peel 112.

Following traveling down the roller bed 14, the fruit 11 is transported via a conveyor 16 to a vacuum infuser 17. The infuser 17 comprises a chamber for infusing the pierced fruit 11 with an aqueous solution to loosen the peel 112. The aqueous solution comprises water containing varying amounts of hydrolyzing enzyme(s) from essentially none to a concentration sufficient to facilitate, if necessary for using the device 20,20',50 of the present invention and achieving substantially complete automation, a softening of the peel 112.

The infused fruit 11 is then transported to a peeling device, shown in a first embodiment 20 in FIGS. 4–9, in a second embodiment 20' in FIGS. 10–19, and in a third embodiment 50 in FIGS. 20–23 for removing the elevated peel 112 from the fruit 11 and also captures the peel 112 for use. In a preferred embodiment the peeling device 20,20',50 comprises a structure into which a fruit 11 can be directed to have its peel 12 scored to a predetermined depth along generally circumferential lines having substantially common endpoints and then gripped between the scores. The peeled fruit is then released from the peel 112 and transported away from the peeling device 20,20',50. It is also believed that other commodities can be peeled with this device 20,20',50, with or without infusion. Among these are included onions, which would not need to be not infused, although this is not intended as a limitation.

The peeling devices 20,20' include a generally square base 21 having a support column 22 extending upward from each corner. To the top ends 222 of each column 22 is affixed for support a first, generally square support plate 23 that has a generally central hole 232 therethrough. The hole 232 is larger in diameter than the fruit 11, or whatever commodity is desired to be peeled.

Spanning the hole 232 are means for supporting the fruit 11 in a first position. Here the support means comprise a plurality of generally triangular fins 233 that are affixed about a periphery of the hole 232 and extend inward and downward from the periphery toward a center of the hole 232. The fins 233 form a hopper, or well, 234 that is adapted to hold the fruit 11 in the first position and have a rigidity sufficient to support the fruit 11 thereupon in a retaining position but are movable to a releasing position to permit the fruit 11 to pass therethrough under applied pressure. The fins 233 are biased to the retaining position, and in a preferred embodiment are affixed to the hole periphery via hinge means.

Extending upwardly above each column 22 is a thruster support arm 24, which comprises an upper end of a double-acting pneumatic cylinder, movable between a top position and a bottom position, to be discussed in the following. To each arm 24 is affixed an inwardly extending member 25, all four of which meet in a thruster support structure 26, to which is affixed the upper end 271,271' of a thruster 27,27'.

The thruster 27 of the first embodiment 20 (FIG. 4), which is adapted to push the fruit 11 from the first position through the fins 233, comprises a downwardly depending cylinder having a lower surface 272 that is shaped to generally conform to a shape of the fruit 11, here an inverse spherical section. The thruster 27' of the second embodiment 20' (FIGS. 10 and 11) comprises a plurality of thruster arms 273' downwardly depending from the support structure 26, which comprises an annular plate 261' around which the thruster arms 273' are arrayed. Means at the bottom ends 272' of the arms 273' for contacting a plurality of sectors along a top section of the fruit 11 are adapted for spreading thruster force across the fruit 11.

Here the contacting means comprise a plurality of feet, here six feet 274', each having a triangular shape and a concave bottom surface shaped to substantially conform to a shape of the fruit 11.

Following being forced by the thruster 27,27' through the fins 233, the fruit 11 is moved into a second position in contact with means for making a plurality of scores in the fruit 11 to a predetermined depth. The scores are made along generally circumferential lines having substantially common endpoints, a first endpoint 111 at the top of the fruit 11 and a second endpoint at the bottom 113 of the fruit 11. Here "top" and "bottom" are of course relative to the device 20,20'.

Figure 5:
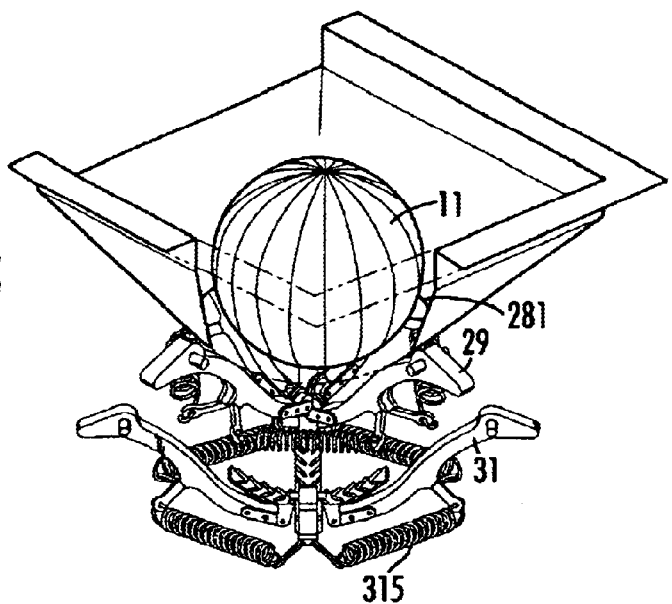
FIG. 5 is a side perspective view of a scoring and peeling head.
Figure 6:
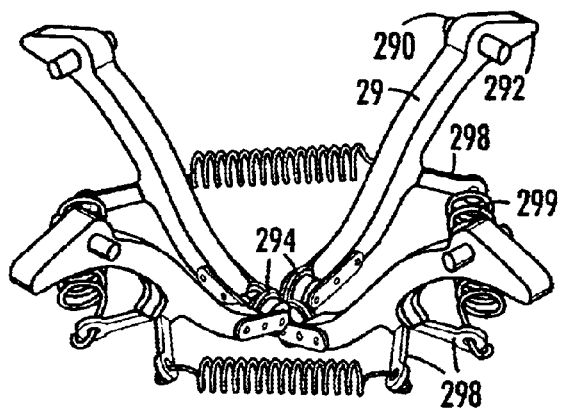
FIG. 6 is a side top perspective view of the scoring assembly.
Figure 7:
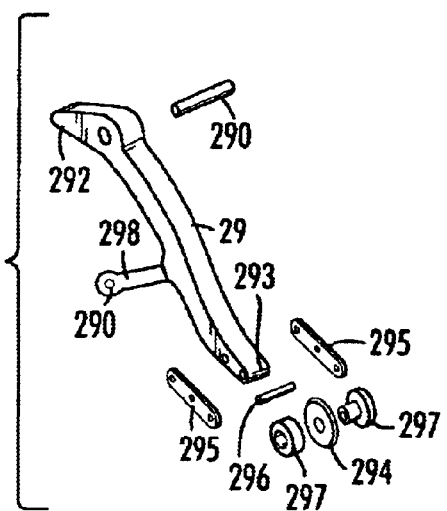
FIG. 7 illustrates an exploded view of a scoring arm/blade assembly.

The scoring assembly comprises a second support plate 28 that is affixed beneath the first support plate 23 to the columns 22. In a particular embodiment the scoring assembly is positioned approximately 24 in, below the hopper 234. The second support plate 28 also has a generally circular hole 281 therethrough. In the first embodiment 20, a plurality of scoring arms 29, here four, are pivotally affixed at a first end 292 via a pin 290 about the periphery of the second support plate's hole 281 (FIGS. 5–7). The arms 29 extend inwardly toward a center of the hole 281. Each arm 29 has a second end 293 that is movable between a first position wherein the second ends 293 are closely opposed generally adjacent the hole's center and a second position wherein the second ends 293 are in spaced-apart relation sufficiently far to permit the fruit 11 to pass therethrough. The arms 29 preferably move in a generally vertical direction, which is parallel to the direction of travel of the fruit 11. The second ends 293 of the arms 29 are positioned lower than the first ends 292, and the arms 29 have a curvature that is shaped to cradle the fruit 11 in the arms' first position.

A scoring cutter is affixed adjacent each scoring arm's second end 293, and each cutter comprises means for varying a depth of a score made in the fruit. In a preferred embodiment, the cutter comprises a circular blade 294 affixed for rotation adjacent the arm's second end 293. Specifically, a pair of pivot supports 295 are affixed to either side of each arm's second end 293 at one end and support a pivot pin 296 at the opposite end. Threaded onto the pivot pin 296 are the circular blade 294 sandwiched between a pair of annular shoulder members 297 that have a diameter less than that of the circular blade 294 and are determinative of a scoring depth into the fruit 11. The shoulder members 297 are interchangeable with other shoulder members having a different diameters, which permits the user to choose a desired scoring depth, for example, for different types of fruit 11.

Each arm 29 has a pair of laterally extending members 298 affixed at a first end to a same side of the arm 29. Each member 298 has a hole 290 at a second end thereof. A spring 299 is attached in connecting relation to members' holes of adjacent arms 29 for biasing the arms 29 to the first position.

In the second embodiment 20' the scoring assembly (FIGS. 12–14 and 16) also comprises a plurality of scoring arms 29', here six, although a number between two and eight may be accommodated in the device as contemplated. Each arm 29' is pivotally affixed at a first end 292' by means of a pin that is affixed to the periphery of the second support plate's hole 281. The arms 29' extend inwardly toward a center of the hole 281. Each arm 29' has a second end 293' that is movable between a first position wherein the second ends 293' are closely opposed generally adjacent the hole's center and a second position wherein the second ends 293' are in spaced-apart relation sufficiently far to permit the fruit 11 to pass therethrough. The second ends 293' of the arms 29' are positioned lower than the first ends 292', and the arms 29' have a curvature that is shaped to cradle the fruit 11 in the arms' first position.

A scoring cutter is affixed adjacent each scoring arm's second end 293', and each cutter comprises means for limiting a depth of a score made in the fruit 11. In a particular embodiment, the cutter comprises a knife blade 294' having a substantially straight edge 295' extending outwardly from the second end 293'. In a particular embodiment, the edge 295' has a length of approximately 1 in.

Each of the knife blades 294' is affixed at each arm's second end 293' by means of a blade stop 296', which has a receptacle 297' for affixing the knife edge's outer end thereinto, and a plate extending from the receptacle's outer end having an upper edge generally parallel to the knife blade 294'. The exposed height of the knife blade 294' determines the cutting depth and can be adjusted by altering the geometry of the blade/stop configuration. For citrus fruit, for example, a cutting depth of approximately ⅛ in. is typically used. The blade stop 296' is affixed to the arm's second end 293' with a chuck and collet 298' set such as known in the art, tightened by a nut at the outer end of each collet 299'. The points of the blades 294' are positioned so that, when the arms 29' are in the first position, the points are closely adjacent to each other. A spring 291' affixed at a first end outside the pivot of the second end 292' and at a second end to the frame 28 biases each arm 29' to the first position.

Figure 17:
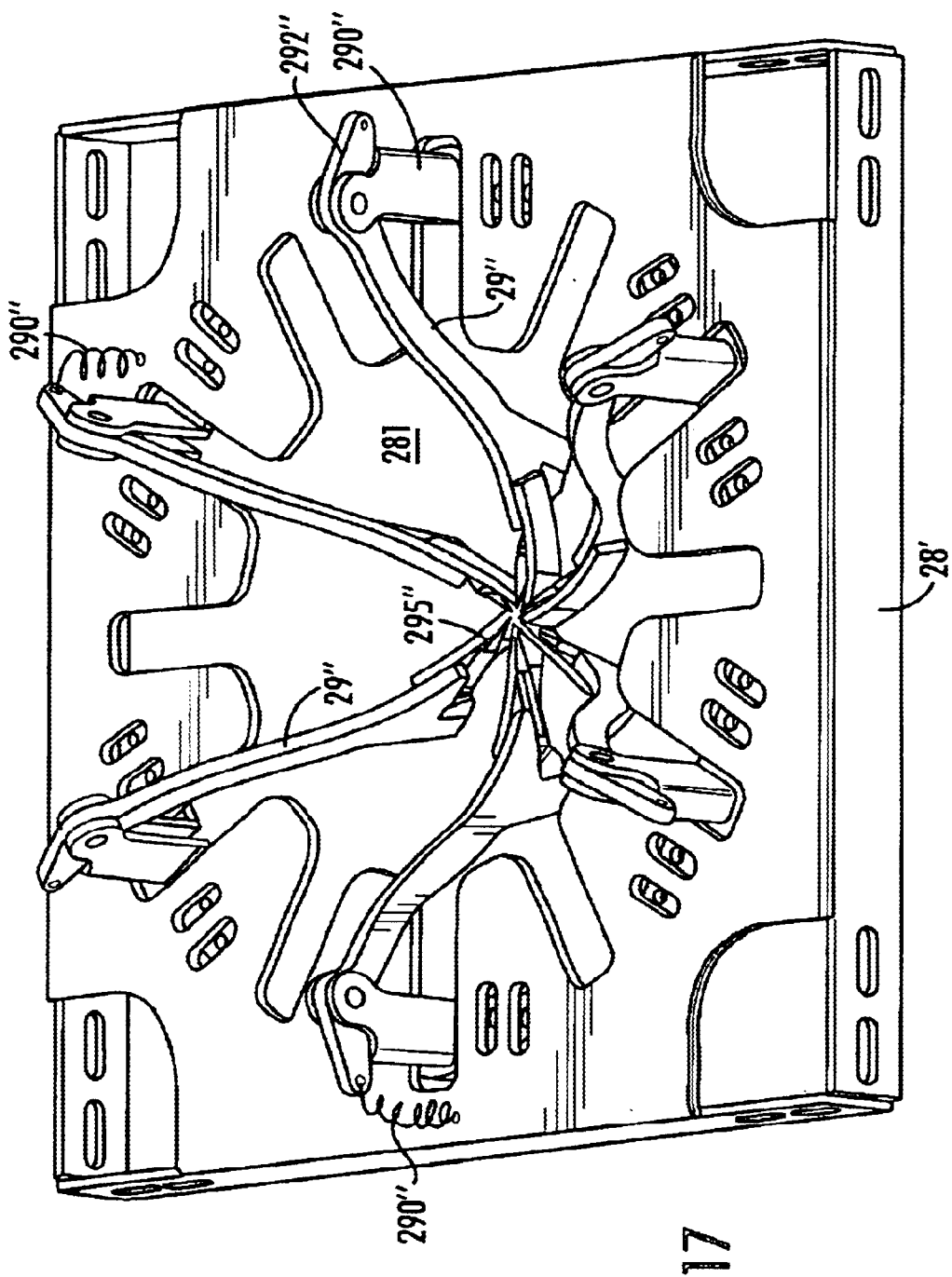
FIG. 17 is a top-side perspective view of another embodiment of the scoring assembly.
Figures 18, 19:
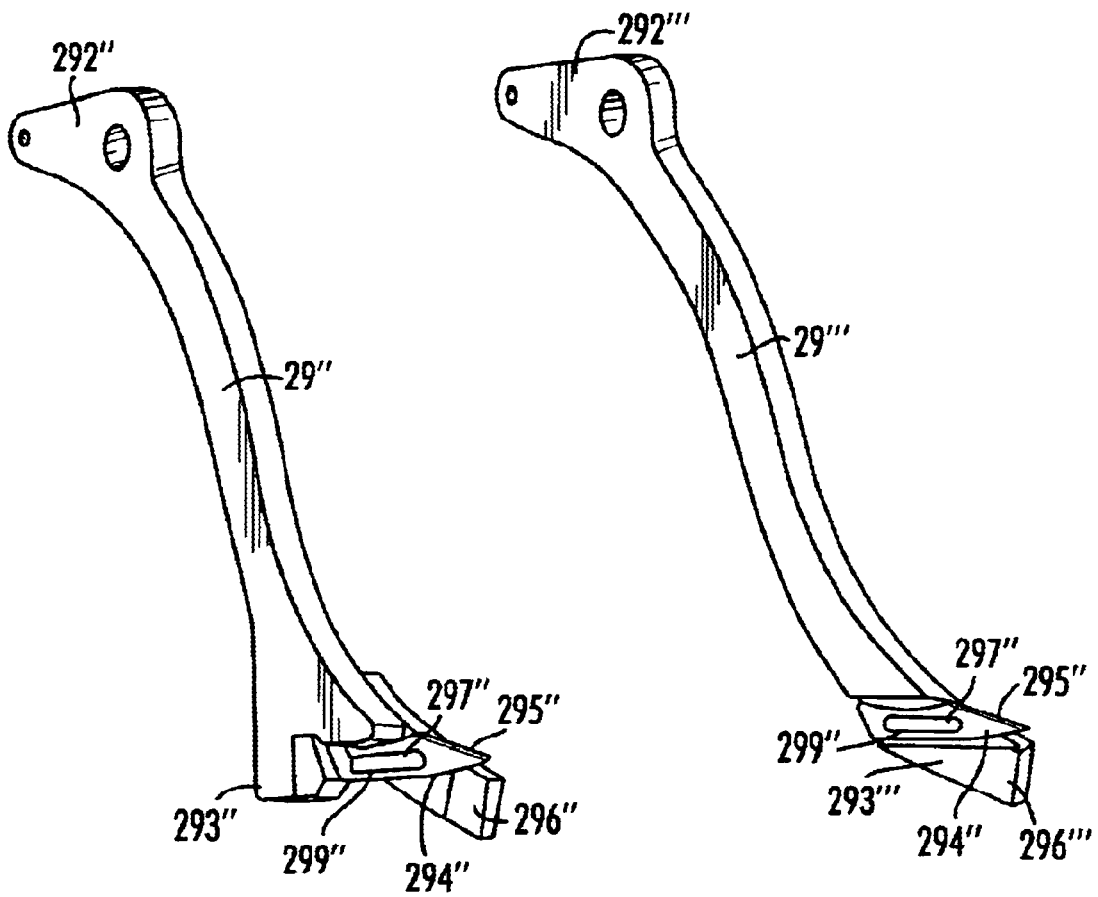
FIG. 18 is a side perspective view of a scoring blade of FIG. 17.
FIG. 19 is a side perspective view of another scoring blade embodiment.

A third, preferred embodiment of the scoring assembly is illustrated in FIGS. 17 and 18. Here there are scoring arms 29", again six, although a number between two and eight may be accommodated in the device as contemplated. Each arm 29" is pivotally affixed at a first end 292" to a bracket 290" that is affixed to the periphery of the second support plate's hole 281. The arms 29" extend inwardly toward a center of the hole 281. Each arm 29" has a second end 293" that is movable between a first position wherein the second ends 293" are closely opposed generally adjacent the hole's center and a second position wherein the second ends 293" are in spaced-apart relation sufficiently far to permit the fruit 11 to pass therethrough. The second ends 293" of the arms 29" are positioned lower than the first ends 292", and the arms 29" again have a curvature that is shaped to cradle the fruit 11 in the first position. A scoring cutter is affixed adjacent each scoring arm's second end 293", and each cutter comprises means for limiting a depth of a score made in the fruit 11. In a particular embodiment, the cutter comprises a surgical-type blade 294" having a substantially straight edge 295" extending outwardly from the second end 293'". In a particular embodiment, the edge 295" has a length of approximately 1 in. Each of the knife blades 294" is affixed at each arm's second end 293" by means of a blade stop 296", which has a protrusion 297" for snapping the knife edge's slot 299" thereonto. The blade stop 296" has an upper edge generally parallel to the knife blade 294". The exposed height of the knife blade 294" determines the cutting depth and can be adjusted by altering the geometry of the blade/stop configuration. For citrus fruit, for example, a cutting depth of approximately ⅛ in. is typically used. The blade stop 296'" is affixed to the arm's second end 293". In another embodiment (FIG. 19) the blade stop 296'" is integral with and forms the arm's 29'" second end, and supports a similar blade 294" as above in FIG. 18. The points of the blades 294" are positioned so that, when the arms 29" are in the first position, the points are closely adjacent to each other. A spring 290" affixed at a first end outside the pivot of the second end 292" and at a second end to the frame 28 biases each arm 29" to the first position.

A downward stroke of the thruster 27,27' pushes the fruit 11 onto the blades 294,294',294", which begin scoring the fruit 11 at a substantially common first endpoint 111 on the fruit 11, formed when the inner ends of the blades 294,294', 294" are closely opposed in the arms' first position. As the thruster 27,27' continues its downward path, the fruit 11 pushes the arms 29,29',29",29'" apart, with the blades 294, 294',294" continuing to score the fruit 11 circumferentially until the arms 29,29',29",29'" again meet in their first position at a substantially common second endpoint 112 essentially diametrically opposed to the first endpoint 111. The fruit 11 then proceeds through the hole 281 in the second plate 28 from the second position into a third position. Means for gripping the peel between the scores are provided in the form of a gripping structure, which includes a third, substantially square support plate 30 that is affixed to the columns 22 beneath the second support plate 28. The third support plate 30 also has a hole 301 therethrough.

Figure 8:
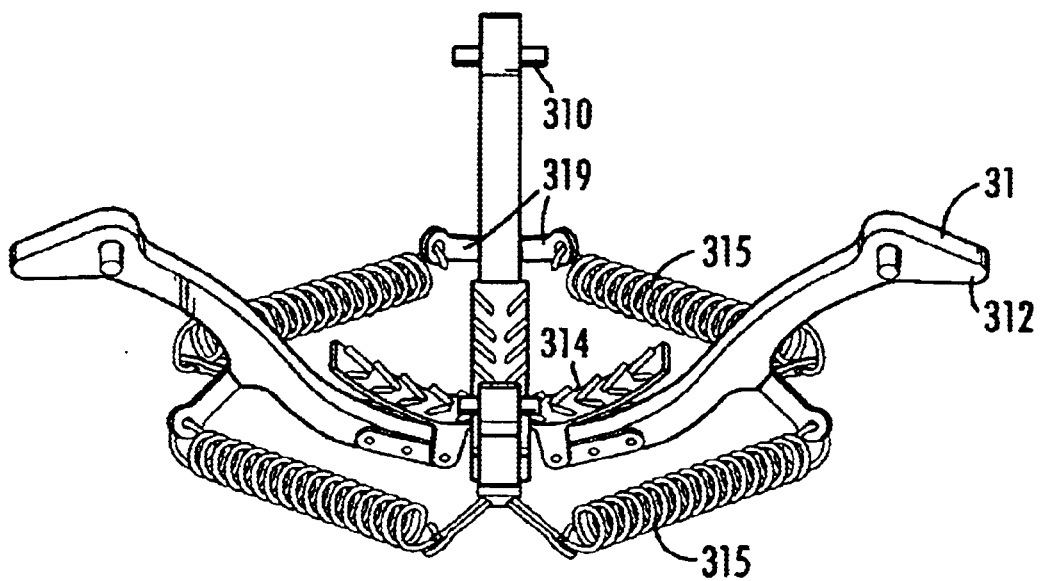
FIG. 8 illustrates a side top perspective view of the paring assembly.
Figure 9:
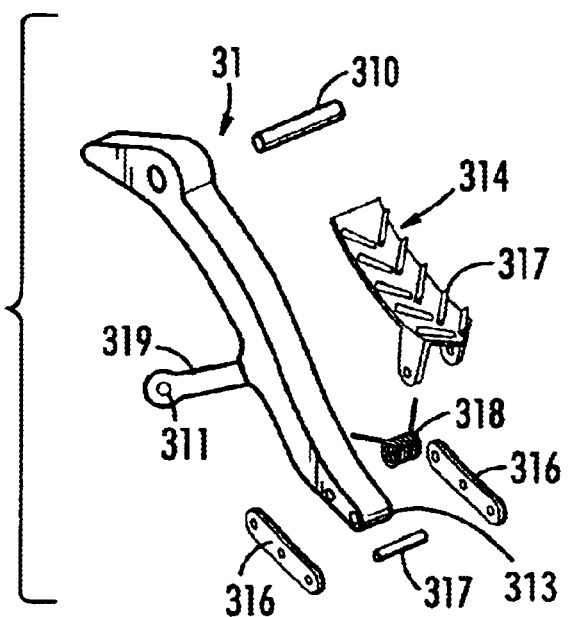
FIG. 9 illustrates an exploded view of a serrated paring spoon.
Figure 10:
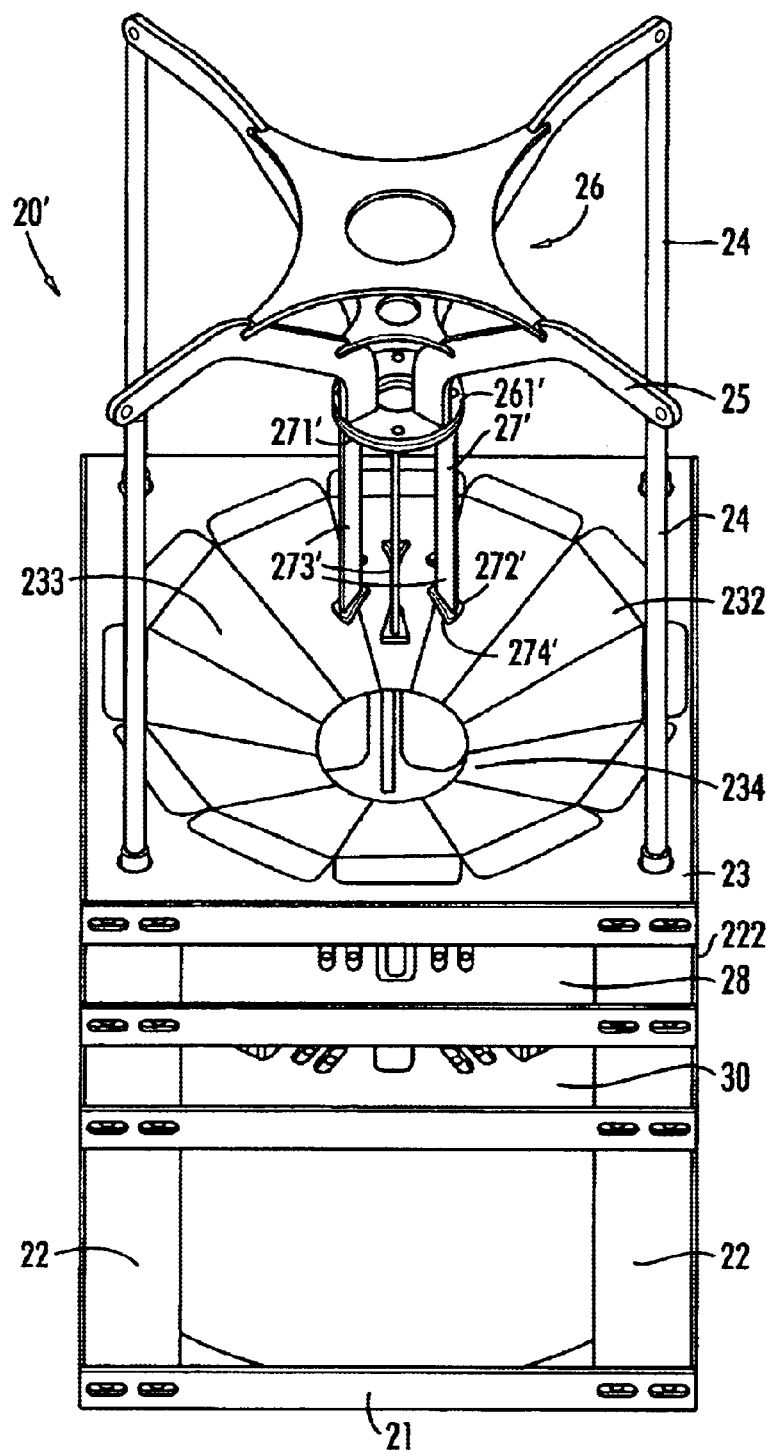
FIG. 10 is a top-side perspective view of an alternate embodiment of the peeling device.
Figure 11:
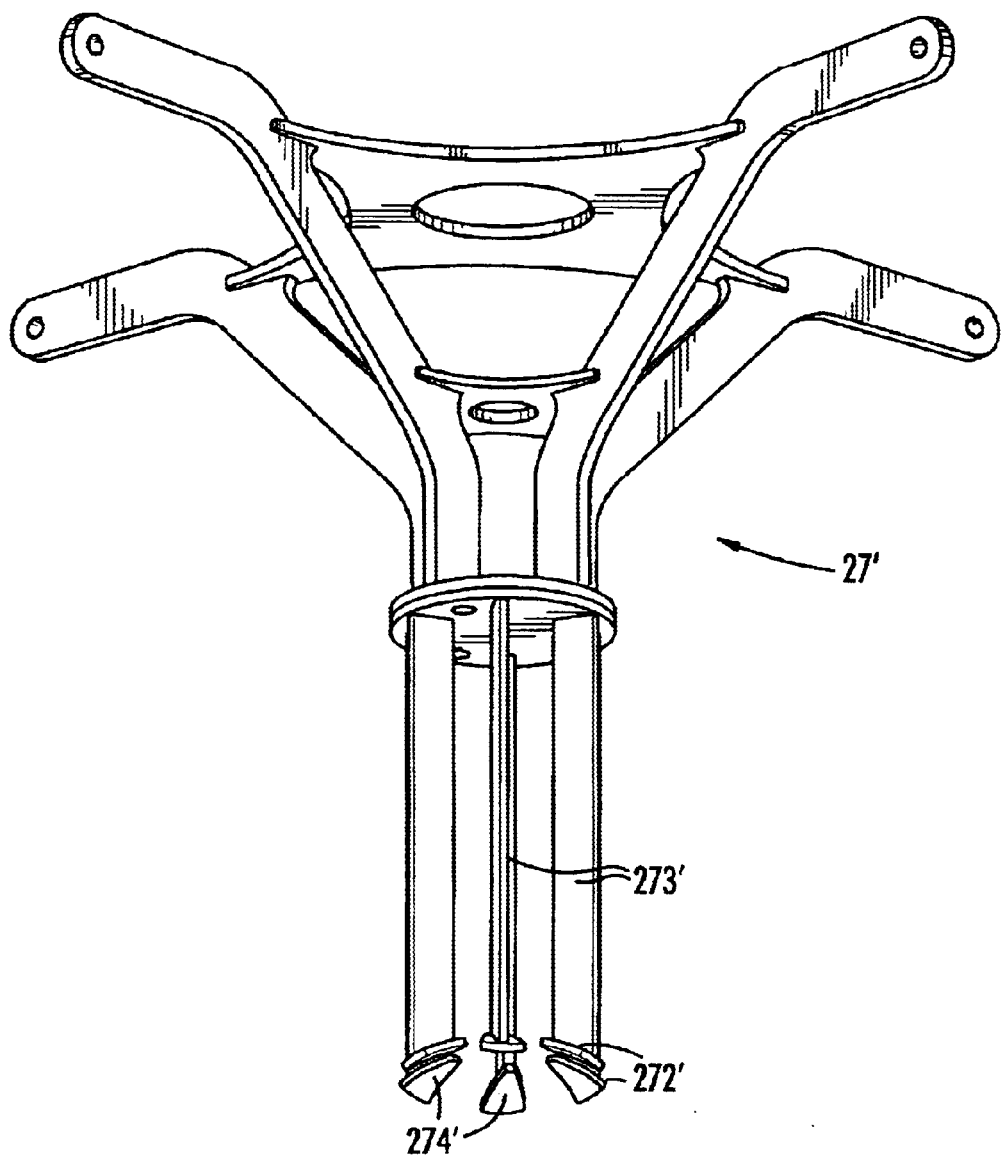
FIG. 11 is a side perspective view of an alternate embodiment of a thruster assembly of FIG. 10.
Figure 12:
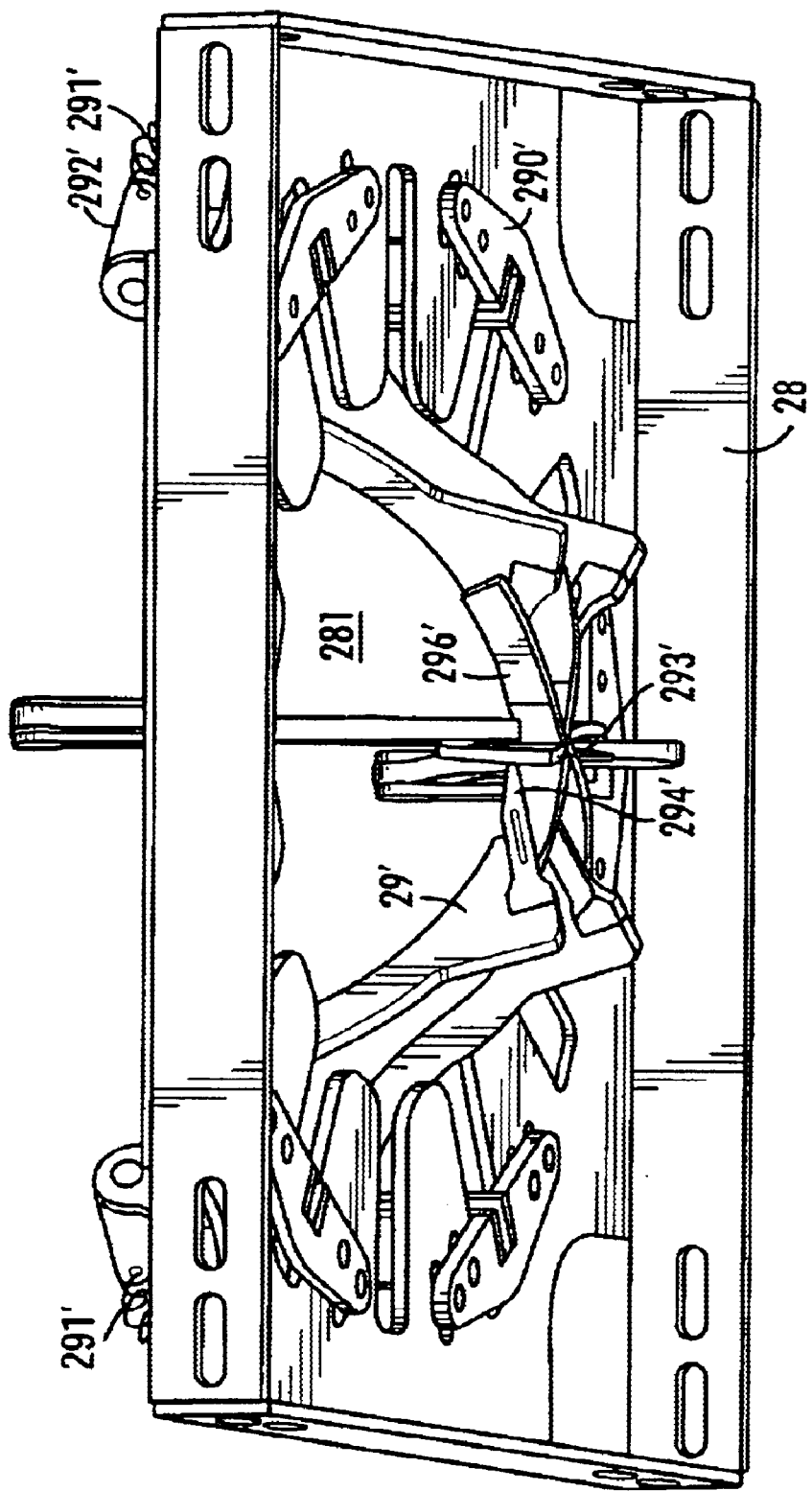
FIG. 12 is a bottom-side perspective view of the scoring assembly of FIG. 10.
Figure 13:
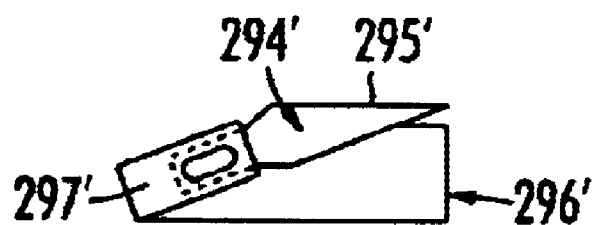
FIG. 13 is a side view of a scoring blade of FIG. 10.
Figure 14:
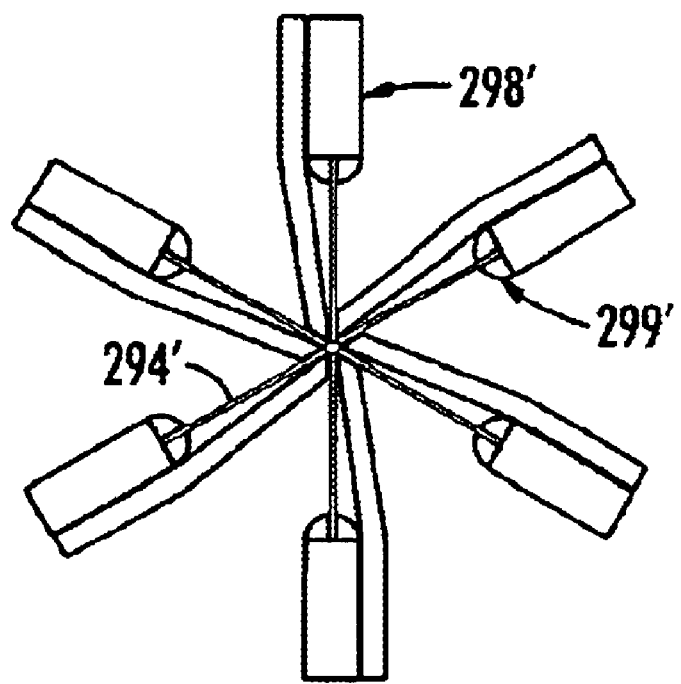
FIG. 14 is a top plan view of the scoring blade assembly of FIG. 10.
Figure 15:
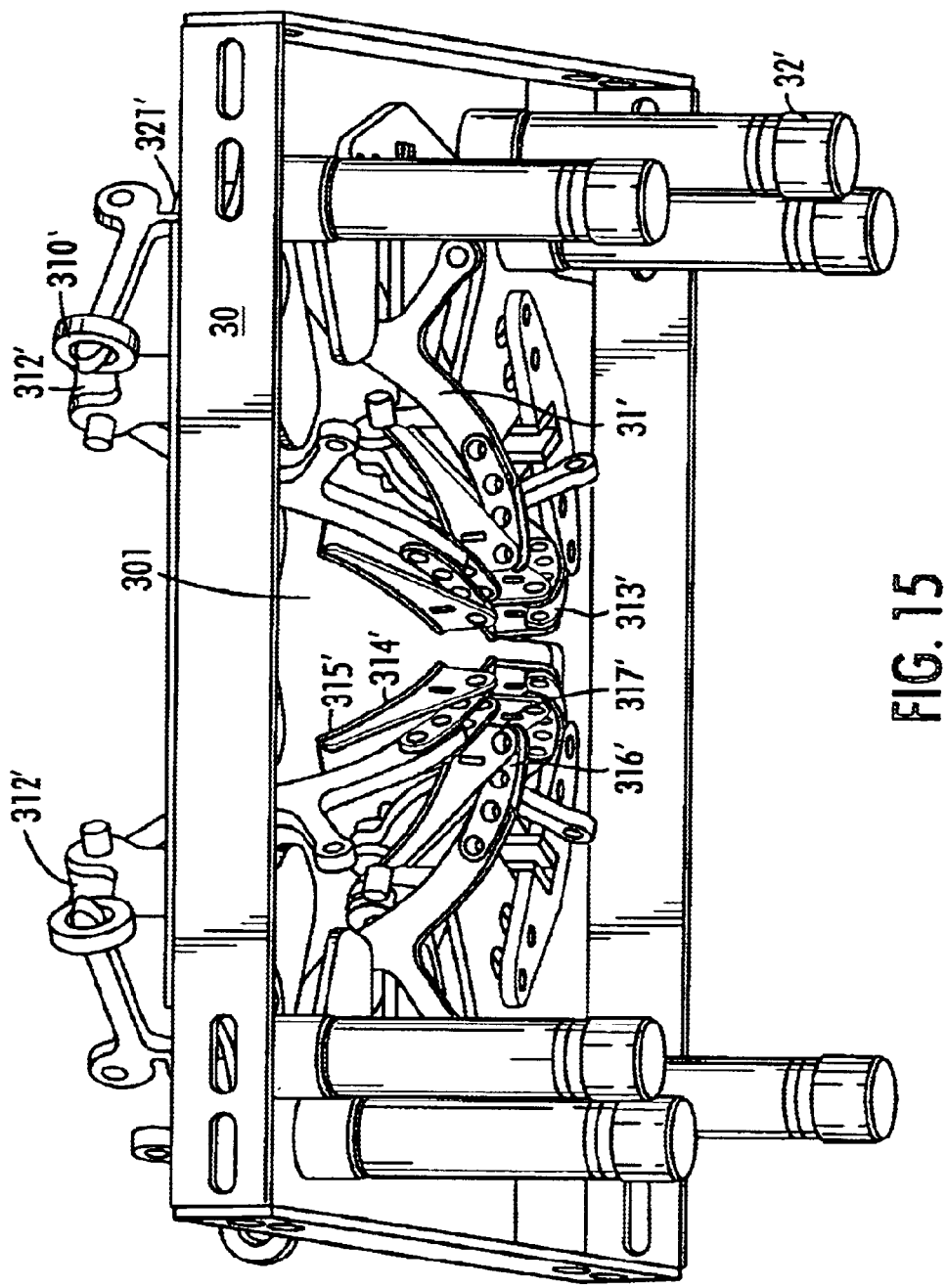
FIG. 15 is a bottom-side perspective view of the gripping assembly of FIG. 10.
Figure 16:
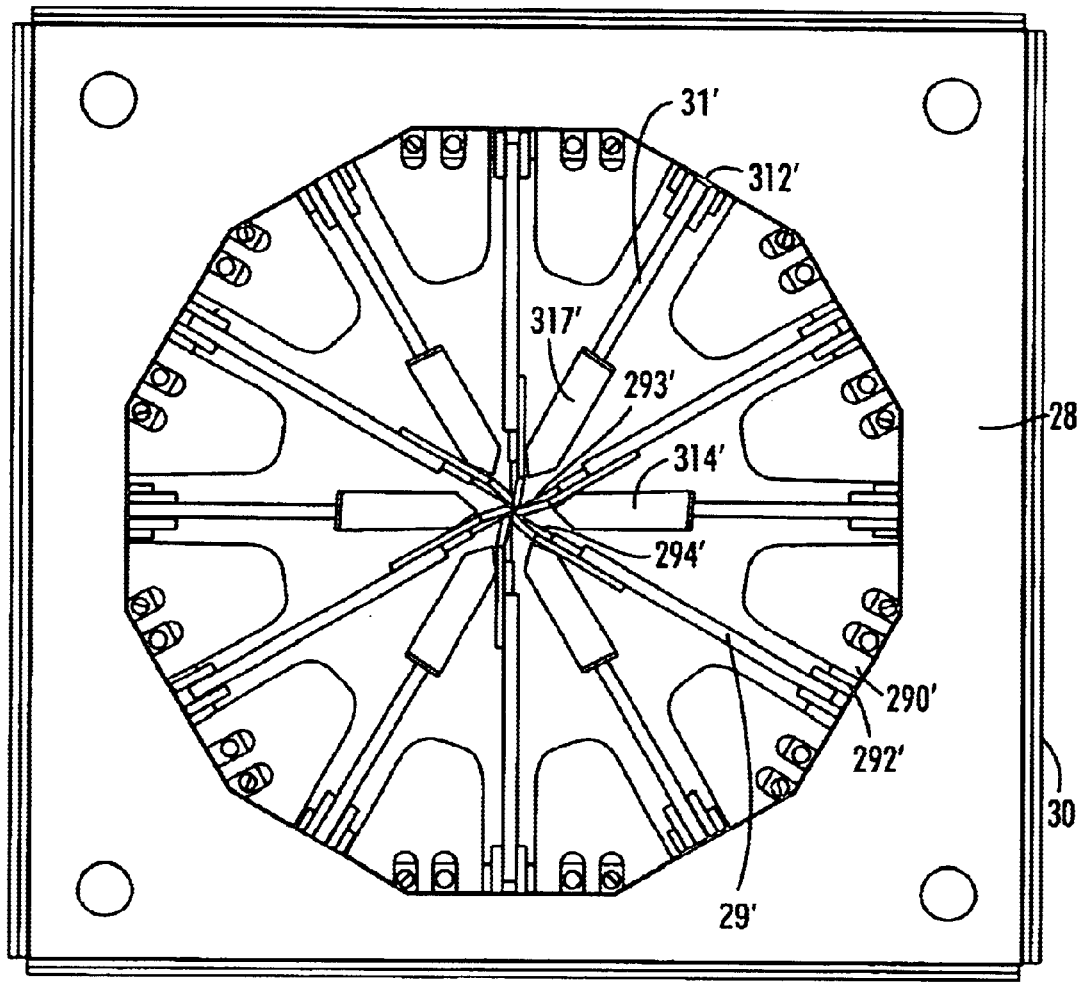
FIG. 16 is a top plan view of the scoring and gripping assembly of FIG. 10.

In the first embodiment 20, a plurality, here four, of paring arms 31 are pivotally affixed at a first end 312 via pin 310 about the hole's periphery and extend inwardly and downwardly toward the center (FIGS. 8 and 9). The paring arms 31 are radially offset from the scoring arms 29. Each paring arm 31 has a second end 313 that is movable between a first position wherein the second ends 313 are closely opposed at the hole's center and a second position wherein the second ends 313 are spaced apart sufficiently far to permit the fruit's flesh to pass therethrough. The arms 31 are shaped to cradle the fruit 11 in the first position.

A gripping member is affixed atop each paring arm's second end 313. Each gripping member comprises an arcuate gripper 314 pivotally affixed at a lower end to the second end 313 of the paring arm 31 and movable between a first position generally atop the paring arm 31 and a second position wherein an upper end 315 is in spaced relation above the paring arm 31. Specifically, a pair of pivot supports 316 are affixed to either side of each arm's second end 313 at one end and support a pivot pin 317 at the opposite end. Threaded onto the pivot pin 317 are the gripper 314 and a torsion spring 318 for biasing the gripper 314 to the first position.

Each paring arm 31 has a pair of laterally extending members 319 affixed at a first end to a same side of the arm 31. Each member 319 has a hole 311 at a second end thereof.

A spring 315 is attached in connecting relation to members' holes of adjacent arms 31 for biasing the paring arms 31 to the first position.

In the second embodiment 20' (FIGS. 15 and 16), a plurality of gripper arms 31', here six, are pivotally affixed at an outer end 312' via linkage system 310' about the hole's periphery and extend inwardly and downwardly toward the center. The gripper arms 31' are radially offset from the scoring arms 29', preferably positioned to approximately bisect the scoring arms' angular separation (see FIG. 16). Each gripping arm 31' has an inner end 313' that is movable between a first position wherein the inner ends 313' are closely opposed at the hole's center and a second position wherein the inner ends 313' are spaced apart sufficiently to permit the fruit's flesh to pass therethrough. The arms 31' are shaped to cradle the fruit 11 in the first position.

A gripping member is affixed atop each gripping arm's inner end 313'. Each gripping member comprises an arcuate gripper 314' pivotally affixed at a lower end to the inner end 313' of the gripping arm 31' and movable between a first position generally atop the gripping arm 31' and a second position wherein an upper end 315' is in spaced relation above the gripping arm 31'. Specifically, a pair of pivot supports 316' are affixed to either side of each arm's inner end 313' and support a pivot pin 317' therethrough. Threaded onto the pivot pin 317' are the gripper 314' and a torsion spring (as above; not shown) for biasing the gripper 314' to the first position.

In both embodiments 20,20' a downward stroke of the thruster 27,27' pushes the fruit 11 onto the grippers 314,314', which, since the gripping arms 31,31' are offset from the scoring arms 29,29', grip the peel 112 between scores. As the thruster 27,27' continues its downward path, the fruit 11 pushes the arms 31,31' apart, with the grippers 314,314' continuing to hold the peel 112. The gripping action of the gripper 314,314' is achieved by a serrated upper surface 317,317' that is adapted to hold the peel 112 while the peeled fruit 11 drops through the third support plate's hole 302.

In the second embodiment 20' means are further provided for releasing the peel 112 from the gripper 314'. Following the release of the peeled fruit 11, the gripping arms 31' will return via the biasing to the first position, with the inner ends 313' closely opposed. A pneumatic cylinder 32' is provided operatively connected to the gripping arms 31' for rotating the arms 31' against the spring tension. A top end 321' of the cylinder 32' is pivotably affixed to the outer end 312' so that, when the cylinder travels upward, the gripper arms 31' open to the second position, and the peel 112 can fall off.

The third embodiment of the peeling device 50 (FIG. 20) includes a generally square base 51 having three grip-lifting columns 52 extending upward from the base 51, each column 52 having a lifting cylinder 520 positioned therein. To the top ends 521 of each column 52 is affixed for support a grip-lifting ring 53 that has a generally central hole 531 therethrough. The hole 531 is larger in diameter than the fruit 11, or whatever commodity is desired to be peeled.

A support brace 54 is, at a bottom end 541, affixed to and extends upward from each corner of the base 51. The support braces 54 are affixed along a central location 542 thereof to an arm support plate 55, and at their top ends 543 to a hopper support plate 56. Both plates 55,56 have generally central holes 551,561 therethrough.

Spanning the hole 561 are means for supporting the fruit 11 in a first position. Here the support means comprise a plurality of flexible, generally triangular fins 562 that are affixed about a periphery of the hole 561 and extend inward and downward from the periphery toward a center of the hole 561. As above, the fins 562 form a hopper, or well, 563 that is adapted to hold the fruit 11 in the first position and have a rigidity sufficient to support the fruit 11 thereupon in a retaining position but are sufficiently flexible to bend to a releasing position to permit the fruit 11 to pass therethrough under applied pressure. The fins 562 are biased to the retaining position, and in a preferred embodiment are affixed to the hole periphery via hinge means. The bottom ends 564 of the fins 562 are splayed outward around a retaining ring 565 to restrict the amount of fin spread.

Affixed to and extending upwardly above two corners of the hopper support plate 56 are the downwardly depending arms 57 of a thruster support 58 (FIG. 21), which supports the thruster assembly 59. To the horizontal arm 60 of the thruster support 58, which spans the downwardly depending arms 57, is affixed a double-acting pneumatic cylinder 61, movable between a top position and a bottom position, to be discussed in the following.

Downwardly depending from the horizontal arm 60 is a thrusting cylinder 62, which has a bottom section 621 that is continuous with the rest of the thrusting cylinder's profile, for preventing possible interference with other moving parts. The cylinder 62 comprises a slide-bearing-type magnetically coupled rodless cylinder having built-in proximity switches for precise cycle timing. This configuration is believed to confer improved stability, alignment, and safety, since a user's appendage caught under the thruster would cause the magnetic coupling to slip off, allowing the thruster to slide freely upward to free the appendage.

The thruster 59 of this embodiment 50 (FIGS. 21–22B) is adapted to push the fruit 11 from the first position through the fins 562 with the downwardly depending cylinder 62. A pair of fruit-releasing cylinders 63 are housed within the cylinder 62. The aspect of the bottom surface 621 of the cylinder 62 has a shape that is changeable from a first, generally concave orientation for generally conforming to a shape of the fruit 11, here an inverse spherical section, to a second, generally convex orientation when the fruit-releasing cylinders 63 move downward. When in the convex orientation, the grippers retain the peel while the fruit is released, as will be discussed in the following.

In a preferred embodiment, the fruit-releasing cylinders 63 emerge from holes in the bottom surface 621 of the cylinder to perform the releasing operation and to thereby change the orientation of the bottom surface 621.

Figure 20:
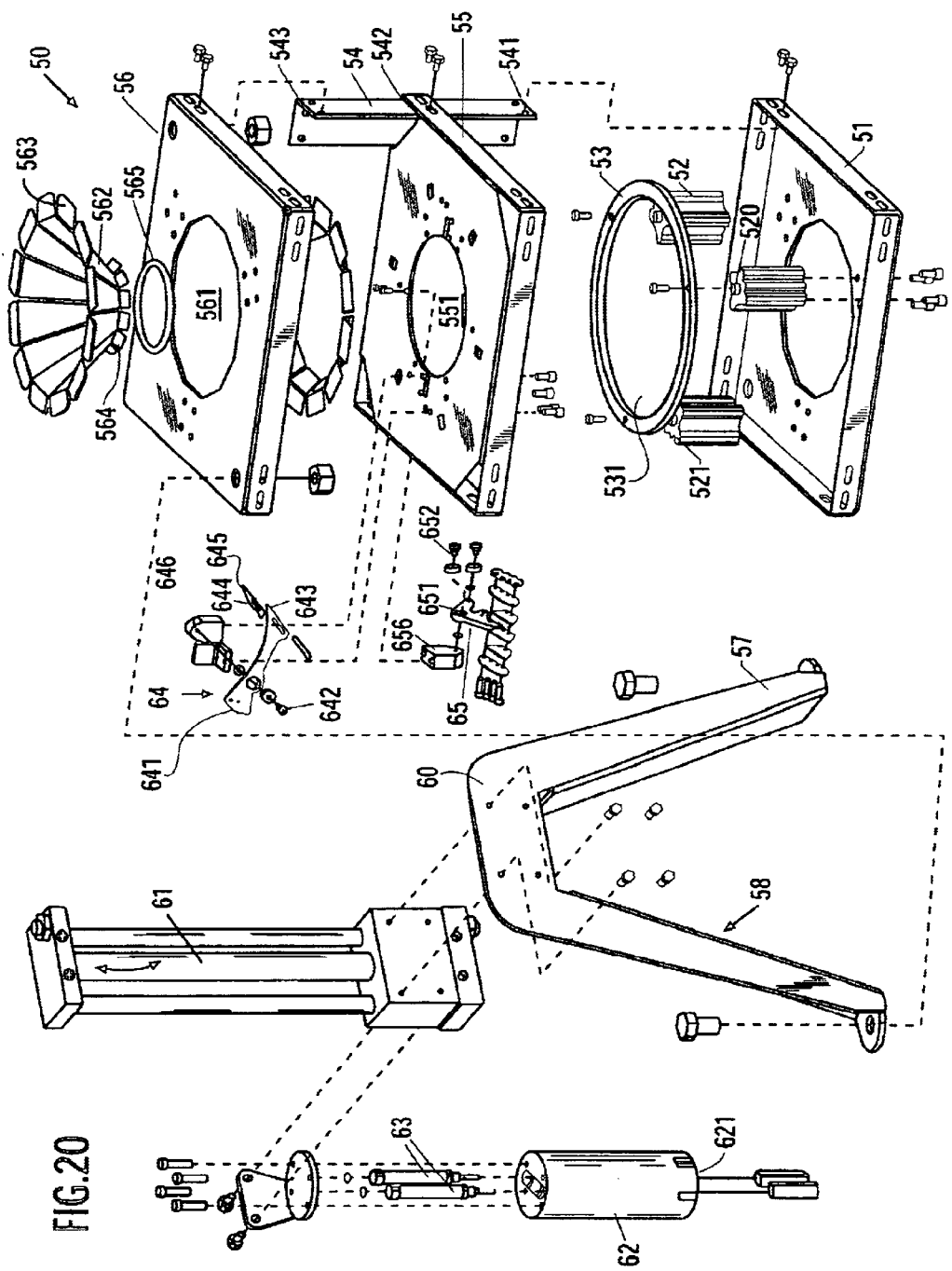
FIG. 20 is an exploded view of a third embodiment of a peeling device.
Figure 21:
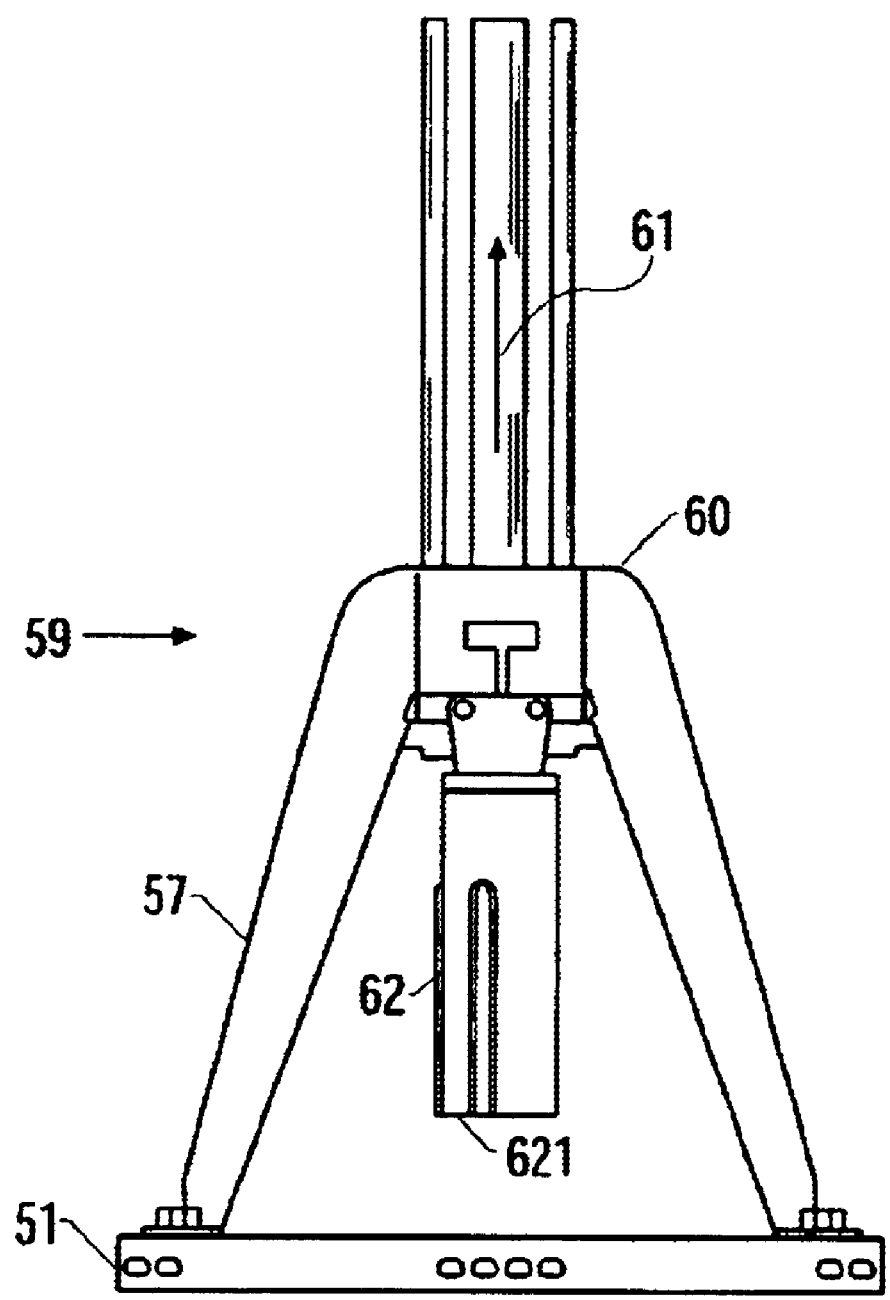
FIG. 21 is a front view of a thruster assembly of the embodiment of FIG. 20.
Figure 22A:
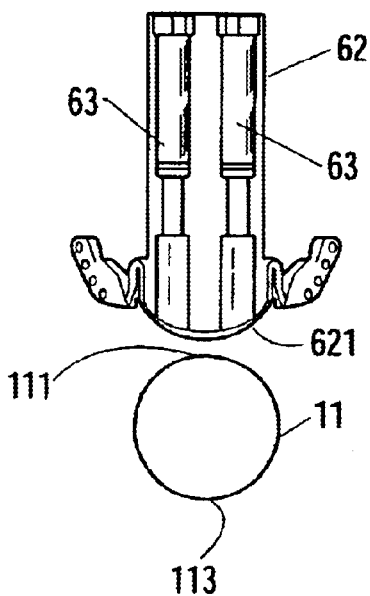
FIG. 22A is a cutaway view of the bottom portion of the thruster assembly of FIG. 21, in position to contact a fruit.
Figure 22B:
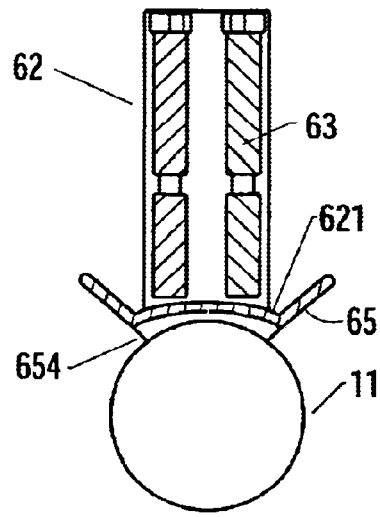
FIG. 22B is a cutaway view of the bottom portion of the thruster assembly of FIG. 21, in contact with the fruit.
Figure 23:
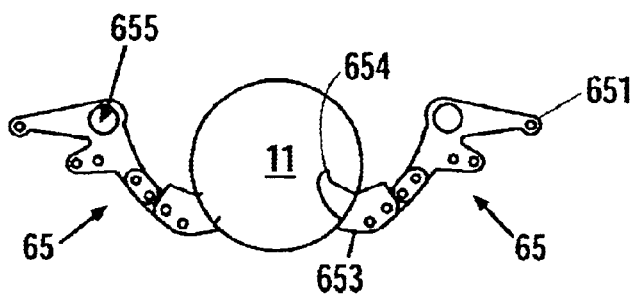
FIG. 23 is a cross-sectional view of a pair of gripping arms gripping the peel of a fruit.

As above, following being forced by the thruster 59 through the fins 562, the fruit 11 is moved into a second position in contact with means for making a plurality of scores in the fruit 11 to a predetermined depth and with means for gripping the scored peel. The scores in this embodiment are made along two generally circumferential lines having substantially common endpoints, a first endpoint 111 at the top of the fruit 11 and a second endpoint 113 at the bottom of the fruit 11. Here "top" and "bottom" are of course relative to the device 50. The scoring and gripping assembly is affixed to the arm support plate 55. In a particular embodiment the scoring assembly is positioned approximately 2–4 in. below the hopper 563. In this embodiment 50, a plurality of scoring arms 64, here two, are pivotally affixed adjacent a first end 641 via a pin 642 adjacent and diametrically opposed across the periphery of the arm support plate's hole 551 (FIG. 20). The number of scoring arms 64 has been reduced in this embodiment in order to increase the size of the peel sectors and thereby improve peel integrity for resisting tearing. The arms 64 extend inwardly toward a center of the hole 551. Each arm 64 has a second end 643 that is movable between a first position wherein the second ends 643 are closely opposed generally adjacent the hole's 551 center and a second position wherein the second ends 643 are in spaced-apart relation sufficiently far to permit the fruit 11 to pass therethrough. The arms 64 preferably move in a generally vertical direction, which is parallel to the direction of travel of the fruit 11. The second ends 643 of the arms 64 are positioned lower than the first ends 641, and the arms 64 have a curvature that is shaped to cradle the fruit 11 in the first position.

A scoring cutter is affixed adjacent each scoring arm's second end 643, and each cutter comprises means for limiting a depth of a score made in the fruit 11. In a particular embodiment, the cutter comprises a knife blade 644 having a substantially straight edge 645 extending outwardly from the second end 643. In a particular embodiment, the edge 645 has a length of approximately 1 in. The exposed height of the knife blade 644 determines the cutting depth. For citrus fruit, a cutting depth of approximately ⅛ in. is typically used. The points of the blades 644 are positioned so that, when the arms 64 are in the first position, the points are closely adjacent to each other. A spring (not shown) affixed at a first end outside the pin 642 and at a second end to the arm support plate 55 biases each arm 64 to the first position.

A downward stroke of the thruster 62 pushes the fruit 11 onto the blades 64, which begin scoring the fruit 11 at a substantially common first endpoint 111 on the fruit 11, formed when the inner ends of the blades 644 are closely opposed in the arms' first position. As the thruster 62 continues its downward path, the fruit 11 pushes the arms 64 apart, with the blades 644 continuing to score the fruit 11 circumferentially until the arms 64 again meet in their first position at a substantially common second endpoint 113 essentially diametrically opposed to the first endpoint 111. The fruit 11 then proceeds through the hole 551 in the arm support plate 55 from the second position into a third position.

Means for gripping the peel between the scores are provided in the form of a gripping structure, which is also affixed to the arm support plate 55. In this embodiment 50, a plurality of, here six, gripping arms 65 (FIG. 23) are pivotally affixed in substantially equiangular fashion at a first end 651 via pin 652 about and beneath the hole's 551 periphery and extend inwardly and downwardly toward the center. The gripping arms 65 are radially offset from the scoring arms 64, with three gripping arms 65 arrayed along each half of the semicircle between the two scoring arms 64 (see FIG. 20). Each gripping arm 65 has a second end 653 that is movable between a first position wherein the second ends 653 are closely opposed at the hole's center and a second position wherein the second ends 653 are spaced apart sufficiently far to permit the fruit's flesh to pass therethrough. The arms 65 are shaped to cradle the fruit 11 in the first position after having been scored.

A gripping member is affixed atop each paring arm's second end 653. The gripping member comprises four gripping barbs 654 affixed to the second end 653 of the gripping arm 65. The barbs 654 have added surface area around the teeth as compared with the previous embodiments, which reduces the pressure exerted by the barb on the peel, thereby reducing peel damage and potential fruit damage. In this embodiment 50 the fulcra 655 of the gripping arms 65 are closer together than in previous embodiments, in order to improve the grip on the peel as the fruit passes through the hole 551.

The scoring 64 and the gripping 65 arms are both mounted with ball bearing members 646,656, which have extremely tight tolerances, resulting in a higher repeatability of the mechanism, reducing a chance of failure.

In this embodiment 50, as above, a downward stroke of the thrusting cylinder 62 pushes the fruit 11 past the scoring blades 644 onto the barbs 654, which, since the gripping arms 65 are offset from the scoring arms 64, grip the peel 112 between scores. As the thrusting cylinder 62 continues its downward path, the fruit 11 pushes the scoring arms 64 apart, with the barbs 654 continuing to hold the peel 112. The gripping action of the barb 654 is adapted to hold the peel 112 while the peeled fruit 11 drops through the arm support plate's hole 551.

Means are further provided for releasing the peel 112 from the barbs 654. The pneumatic cylinders 520 within the columns 52 elevate the ring 53, which is positioned to engage the first end 651 of the gripping arms 65. This action forces the gripping arms 65 away from the peel 112, so that the peel 112 can fall off.

The peeled fruit 11 and the peel 112 may then be separately conveyed to a desired location for further processing and packaging.

In summary, then, the fruit 11 is transported to the peeling device 20,20',50 via conveyor 18 from hopper 17 and dispensed one at a time by start-stop indexing the conveyor 18. The fruit 11 falls onto the hopper 233, where it settles briefly in a nonspecific orientation. The thruster 27,27',62 pushes the fruit 11 through the scoring mechanism, where the fruit 11 is scored along equally spaced longitudinal lines beginning at the first endpoint 111 and continuing to the opposite endpoint 113. Upon clearing the scoring blades 294,294',64, the peel 112 is impaled on grippers 314,314', 654. The thruster 27,27',62 continues pushing the fruit from the top, forcing the gripping arms 31,31',65 apart, and the fruit flesh falls downward and is conveyed away, while the peel 112 is retained on the grippers 314,314',654. Next the peel 112 is ejected and conveyed away. Finally, the thruster 27,27',62 is returned to the upper position to begin another peeling cycle.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus, system, and method illustrated and described herein are byway of example, and the scope of the invention is not limited to the exact steps and details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An automated device for separating a peel from a flesh of a substantially elliptical commodity, the commodity in a nonspecific orientation, the device comprising:
   means for simultaneously making a circumferential score in a commodity to form two peel sectors;
   means for gripping the peel sectors in a first position wherein the peel sectors are substantially in contact with the flesh; and
   a thruster movable between an upper position wherein a bottom surface is positioned adjacent the first intersection point and a lower position wherein the gripping means grip the peel sectors and open to a second position wherein the peel sectors are substantially separated from the flesh, the thruster bottom surface having a substantially concave orientation in the upper position for conforming to a shape of the commodity and having a substantially convex orientation in the lower position for gripping the peel sectors and for releasing the flesh from the peel sectors.

2. The device recited in claim 1, wherein the scoring means comprises a plurality of spaced-apart support means and a blade affixed to an inner end of each of the support means, the support means spring loaded and biased to a central position wherein the blades are generally closely adjacent.

3. The device recited in claim 2, further comprising a frame having a central lumen dimensioned to permit the commodity to pass therethrough, and wherein the support means each comprise a blade arm affixed adjacent an outer end to the frame.

4. The device recited in claim 3, wherein the blades each comprise a knife blade having a substantially straight edge.

5. The device recited in claim 1, wherein the gripping means comprises a frame having a central lumen dimensioned to permit the commodity to pass therethrough, a plurality of gripping arms movably affixed in spaced apart relation adjacent an outer end to the frame, and a gripping element affixed to an inner end of each gripping arm, the gripping element having barbs adapted for piercing and holding a sector of the peel.

6. The device recited in claim 1, further comprising:

a base;

means affixed to the base for supporting the thruster adjacent a top end thereof and for impelling the thruster along a substantially vertical pathway;

a substantially conical hopper affixed to the base beneath the thruster support means having a central hole at a lowest point of the hopper, the hopper conformable between a first state wherein the central hole has a first diameter dimensioned for retaining the commodity thereatop and for positioning the commodity beneath the thruster and a second state wherein the central hole has a second diameter larger than the first diameter dimensioned for passing the commodity therethrough, the hopper biased to the first state;

means affixed to the base beneath the hopper for supporting the scoring means in a position to accept a commodity passing through the hopper hole and for supporting the gripping means beneath the scoring means in a position to accept a scored commodity;

wherein in a starting configuration a top end of a commodity is in contact with the bottom surface of the thruster, and during use the thruster is impelled downward relative to the base, forcing the commodity through the hopper hole, the hopper in the second state, forcing the commodity past the scoring means and onto the gripping means, and forcing the gripping means into the second position for releasing the commodity flesh.

7. The device recited in claim 6, wherein the thruster comprises a slide-bearing type magnetically coupled rodless pneumatic cylinder operatively connected with the thruster for impelling the thruster between the upper and the lower positions.

8. The device recited in claim 1, wherein the thruster comprises a cylindrical member and a fruit-releasing cylinder housed within the cylindrical member, the fruit-releasing cylinder actuatable to move the thruster bottom surface between the concave and the convex orientations.

9. The device recited in claim 1, further comprising means for releasing the peel sectors from the gripping means.

10. The device recited in claim 9, wherein:

the gripping means comprises a plurality of gripping arms having a plurality of barbs at a second end and a first end opposed to the second end, the gripping arms pivotable about a fulcrum between the first and the second ends; and the releasing means comprises a grip-lifting ring and means for lifting the ring between a lower position wherein the gripping arms are in the first position and an upper position wherein the ring-lifting means lifts the ring into contact with the gripping arms first end and further lifts the gripping arms first end for moving the gripping arms into the second position.

* * * * *